United States Patent
Dolan et al.

(10) Patent No.: US 10,694,612 B2
(45) Date of Patent: Jun. 23, 2020

(54) LIGHTING CONTROL SYSTEM WITH EMERGENCY MODE

(71) Applicant: Lutron Technology Company LLC, Coopersburg, PA (US)

(72) Inventors: David J. Dolan, Coopersburg, PA (US); Jackson Burlew, Bethlehem, PA (US); Aditya Sreekumar, Coopersburg, PA (US); Andrew G. Rohm, Somerville, MA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/278,475

(22) Filed: Feb. 18, 2019

(65) Prior Publication Data

US 2019/0261493 A1    Aug. 22, 2019

Related U.S. Application Data

(60) Provisional application No. 62/631,696, filed on Feb. 17, 2018.

(51) Int. Cl.
   *H05B 47/19*   (2020.01)
   *H05B 47/105*  (2020.01)

(52) U.S. Cl.
   CPC ........... *H05B 47/19* (2020.01); *H05B 47/105* (2020.01)

(58) Field of Classification Search
   CPC ............ H05B 37/0272; H05B 37/0227; H05B 47/19; H05B 47/105; H02J 9/02
   USPC ......................................................... 340/540
   See application file for complete search history.

(56) References Cited

U.S. PATENT DOCUMENTS

| | | | | | |
|---|---|---|---|---|---|
| 5,357,170 | A | * | 10/1994 | Luchaco | H05B 37/02 315/149 |
| 6,538,568 | B2 | * | 3/2003 | Conley, III | G08B 7/062 315/86 |
| 6,754,602 | B1 | * | 6/2004 | Tkachenko | H02J 9/02 702/108 |
| 7,218,056 | B1 | * | 5/2007 | Harwood | G08B 7/066 307/66 |
| 8,228,163 | B2 | | 7/2012 | Cash et al. | |

(Continued)

OTHER PUBLICATIONS

"Emergency Lighting System", Ketra, 2017, 3 pages.

*Primary Examiner* — John A Tweel, Jr.
(74) *Attorney, Agent, or Firm* — Amy Yanek; Glen Farbanish; Philip Smith

(57) ABSTRACT

A load control system has a system controller and a plurality of load control devices which receive power from a utility power source. The load control system has at least one emergency load control device which receives power from a backup power source in the event of a power failure of the utility power source. The emergency load control device is configured to enter an emergency mode during the power failure of the utility power source, wherein in the emergency mode, the emergency load control device controls respective electrical loads according to emergency mode preset settings, and the emergency load control device transmits a message to the system controller to indicate the emergency load control device is in the emergency mode. The system controller is configured to transmit a message to the emergency load control device to exit the emergency mode when power from the utility power source is restored.

16 Claims, 8 Drawing Sheets

(56) References Cited

U.S. PATENT DOCUMENTS

| | | | |
|---|---|---|---|
| 8,491,159 B2 | 7/2013 | Recker et al. | |
| 8,880,199 B2 * | 11/2014 | Wei | H05B 33/0842 |
| | | | 307/66 |
| 8,994,276 B2 * | 3/2015 | Recker | H05B 37/0272 |
| | | | 315/160 |
| 9,595,845 B2 * | 3/2017 | McBryde | H02J 9/02 |
| 10,096,997 B2 * | 10/2018 | Dushane | H02J 3/14 |
| 2018/0279441 A1 | 9/2018 | Shearer et al. | |

* cited by examiner

LIGHTING CONTROL SYSTEM WITH EMERGENCY MODE

CROSS-REFERENCE TO RELATED APPLICATIONS

This application claims the benefit of U.S. Provisional Patent Application No. 62/631,696, filed Feb. 17, 2018, the disclosure of which is hereby incorporated by reference herein in its entirety.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and air-conditioning (HVAC) system may be used to control the temperature in the user environment.

Each load control system may include various control devices, including input devices and load control devices. The load control devices may receive digital messages, which may include load control instructions, for controlling an electrical load from one or more of the input devices. The load control devices may be capable of directly controlling an electrical load. The input devices may be capable of indirectly controlling the electrical load via the load control device. The load control devices may be emergency load control devices and may control one or more loads to an emergency mode when a loss of utility power has occurred.

Automatic load control relays (ALCR) may be used to provide power to one or more lighting loads when utility power has been lost. However, ALCRs may add cost and complexity to a lighting control system, requiring additional wiring and increased time to install. Therefore, it is desirable for a load control system to have an emergency mode with minimal additional wiring, which may not require the use of ALCRs.

SUMMARY

Described herein is an example load control system wiring for emergency devices. According to a first example, an emergency load control device may startup in an emergency mode powered from a backup power source when a power outage of a utility power source has occurred. In the emergency mode, the emergency load control device may control its respective lighting load to one or more emergency preset light levels and/or color temperature. The emergency lighting load may periodically transmit a message to one or more system controllers indicating that the emergency lighting load is in the emergency mode. The emergency lighting load may remain in the emergency mode until receiving a message from the system controller to exit the emergency mode.

According to a second example described herein, a power detector may be wired to the utility power to determine when a power outage of the utility power source occurs. Based on detecting that a power outage has occurred, the power detector may transmit a message to one or more system controllers which may transmit a command to tell the emergency load control devices to enter emergency mode.

According to a third herein, a load control system with multi-phase power may have one or more power detectors on one or more phases of power. The emergency load control devices may be configured to enter emergency mode upon detecting a power blip (i.e., when starting up after a power on reset). In the emergency mode, the emergency load control devices may transmit one or more messages indicating the emergency load control device is in the emergency mode. The system controller may receive the one or more messages and may further detect when power has been restored on the respective phases of power. The system controller may further transmit a message to communicate to the emergency load control devices to exit the emergency mode when power is restored on the respective phase of power.

DETAILED DESCRIPTION

Figure 1:
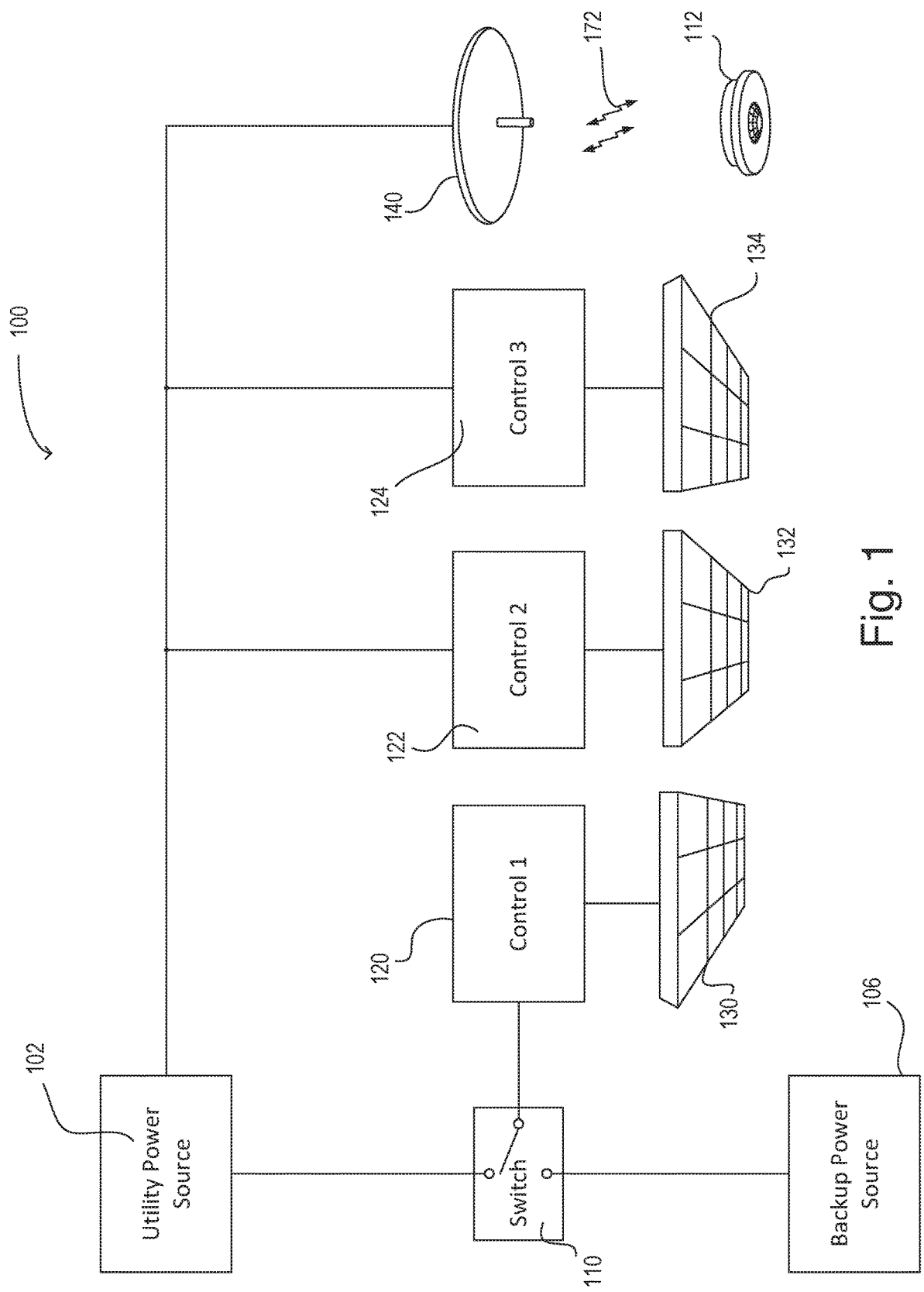
FIG. 1 is an example load control system according to a first example.

FIG. 1 is an example load control system 100 showing power provided to one or more devices in a space. The load control system 100 may contain one or more control-target devices, for example, load control devices 120, 122, 124. The load control devices may be configured to control electrical loads. For example, the load control devices 120, 122, 124 may be configured to control electrical lighting loads 130, 132, 134, respectively as shown. The electrical lighting loads 130, 132, 134 may be fluorescent, light-emitting diode (LED), halogen, incandescent, or sodium-vapor lamps, or any other type of lighting load, for example. Each load control device 120, 122, 124 may be configured to directly controlling the amount of power provided to an electrical load, for example, lighting loads 130, 132, 134, and may be controlled by a control-source device, such as a remote control or wall switch, etc. (not shown).

Control devices (e.g., a control-source device and/or a control-target device) may communicate with each other and/or other devices via a wired and/or a wireless communication link. For example, the control devices may communicate via radio frequency (RF) signals 172. The RF signals 172 may be transmitted via any known RF communication technology and/or protocol (e.g., near field communication (NFC); BLUETOOTH®; WI-FI®; ZIGBEE®; a proprietary communication channel, such as CLEAR CONNECT™; etc.). A control device may be both a control-target and a control-source device.

A control-source device may be an input device that indirectly controls the amount of power provided to an electrical load by transmitting messages, for example, digital messages, to the control-target device. The messages may include control instructions (e.g., load control instructions) or another indication that causes the control-target device to determine load control instructions for controlling an electrical load. Example control-source devices may include remote control devices (not shown), an occupancy sensor 112, a daylight sensor, a window sensor, etc. The control-source devices may include a wired or wireless device. The control-source devices may include a control device, such as a dimmer switch, an electronic switch, or the like.

The load control system 100 may include a system controller 140 (e.g., a hub device) configured to transmit and/or receive messages via wired and/or wireless communications. For example, the system controller 140 may be configured to transmit and/or receive the RF signals 172, to communicate with one or more control devices (e.g., control-source devices and/or control-target devices). The system controller 140 may communicate messages between associated control devices, for example. One or more control devices may be associated to each other and/or to the system controller 140 during a configuration of the load control system, wherein associated devices may be configured to communicate messages to each other. The system controller 140 may be coupled to one or more wired control devices (e.g., control-source devices and/or control-target devices) via a wired communication link. For example, the system controller 140 may be on-site at the load control environment 100, or the system controller 140 may be located at a remote location from the load controls devices 120, 122, 124, i.e., in a different room of a building, etc. Though the system controller 140 is shown as a single device, the load control system 100 may include multiple system controllers and/or the functionality thereof may be distributed across multiple devices.

The occupancy sensor 112 may be configured to detect occupancy and/or vacancy conditions in an area in which the load control system 100 is installed. The occupancy sensor 112 may transmit messages to control-target devices via the RF communication signals 172 in response to detecting the occupancy or vacancy conditions. The occupancy sensor 112 may operate as a vacancy sensor, such that messages are transmitted in response to detecting a vacancy condition (e.g., messages may not be transmitted in response to detecting an occupancy condition). Examples of RF load control systems having occupancy and/or vacancy sensors are described in greater detail in U.S. Pat. No. 8,009,042, issued Aug. 10, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The load control devices 120, 122, 124 may control the respective lighting loads 130, 132, 134 in response to a command from a control-source device, such as the occupancy sensor 172, and/or the system controller 140. For example, the load control devices 120, 122, and/or 124 may be configured to turn their respective lighting loads from an off state to an on state in response to receiving a message from the occupancy sensor 112 indicating that the area is occupied. Examples of load control systems with control-source and control-target devices responsive to a system controller are described in more detail in U.S. Pat. No. 6,803,728, issued Oct. 12, 2004, entitled "System For Control Of Devices," and U.S. Pat. No. 9,553,451, issued Jan. 24, 2017, entitled "Load Control System Having Independently-Controlled Units Responsive To A Broadcast Controller," the entire disclosures of which are incorporated herein by reference.

The load control devices 120, 122, 124 may be wall-mounted load control devices, such as switches or dimmers. Additionally or alternatively, the load control devices may be installed above the ceiling or integrated into a lighting fixture. For example, the load control devices may be a dimming or switching module, such as a power pack; a light emitting diode (LED) driver; a fluorescent ballast, etc. The control devices 120-124 may be configured to control power to the one or more lighting loads 130-134. The control devices 120-124 may have power failure memory, i.e., may periodically store a current state of the lighting load 130-134 in memory. For example, the control devices 120-124 may store an intensity and/or a color temperature of the respective lighting load 130-134 in memory.

The load control devices 120, 122, 124 and the lighting loads 130-134 may be powered by power generated by an electric utility (e.g., AC mains power). For example, load control device 122 and 124 may be powered by (i.e., receive power from) a utility power source 102. However, the utility power 102 may occasionally experience power outages. Therefore, the space or building in which the load control system 100 is installed may also have a backup power source 106. The backup power source 106 may be configured to provide power to one or more of the load control devices 120-124 and lighting loads 130-134 in the event of a power outage. For example, building codes may require commercial buildings to power one or more of the lighting loads in the event of a power outage of the utility power source 102 to maintain a minimum light level in the space during the power outage. Some example building codes which outline the requirements for emergency lighting and power are the National Fire Protection Association (NFPA) 101 Life Safety Code, NFPA 1 Fire Code, International Building Code IBC, International Fire Code (IBC), and NFPA 70: National Electric Code (NEC).

The lighting loads that are configured to be powered by the backup power source during a power outage of the utility power source 102 may be referred to as "emergency" lighting loads. For example, the lighting load 130 may be an emergency lighting load. The load control device 120 which controls power to the emergency lighting load 130 may be connected to a transfer switch 110, e.g., an automatic transfer switch (ATS). The transfer switch 110 may normally provide power to the load control device 120 (and therefore the lighting load 130) from the utility power source 102. When a power outage occurs and the utility power 102 is no longer able to power the load control device 120 and the lighting load 130, the transfer switch 110 may changeover to providing power from the backup power source 106. In this way, the emergency lighting load 130 may remain illuminated to light a portion of the area in which the load control system 100 is installed, even when lighting loads 132 and 134 have lost power due to the utility power outage. The backup power source 106, which provides power to the emergency lighting loads, may be a generator, a battery bank, one or more solar cells, etc.

When the utility power 102 experiences a power outage, the lighting loads 132, 134, the control devices 122, 124, and the system controller 140 may all lose power. Additionally, the control device 120 and the lighting load 130 may also lose power for a brief duration of time ("power blip") as the transfer switch 110 changes over from the utility power source 102 to the backup power 106. For example, the brief duration of time of a power blip may be greater than 250 milliseconds and less than or equal to 10 seconds. The control device 120 may rely on the brief power dropout to sense that a power outage has occurred and to enter an emergency mode. For example, the power dropout may cause the control device 120 to undergo a power cycle. Upon powerup, the control device 120 may startup in emergency mode. For example, the control device 120 may experience a power cycle or a power reset in response to the power blip when the transfer switch 110 changes power from the utility power source 102 to the backup power source 106.

The emergency mode may include presets of a specified light level and/or color temperature. For example, prior to entering the emergency mode, the lighting load 130 may be turned off if the area is unoccupied. However, if the control device 120 senses a power outage (i.e., experiences a power reset), the control device 120 may enter the predefined emergency mode. In the emergency mode, the control device 120 may cause the lighting load to turn on to 75% intensity, for example. One will understand that this intensity is provided as an example, and that other light level (and/or changes in color temperature) presets are possible. For example, the emergency light level may be 100% light intensity.

While the control device 120 is in the emergency mode, the control device 120 may transmit an emergency mode message to one or more devices in the load control system. The emergency mode message may be transmitted via a wired or wireless communication. Further, the control device 120 may repeatedly transmit the emergency mode message, for example, transmit the message a plurality of times. For example, the load control device 120 may transmit an emergency mode message once per minute. The control device 120 may remain in emergency mode until receiving instructions from the load control system (i.e., via the system controller 140) to exit the emergency mode. The emergency mode message may be transmitted at irregular intervals. For example, transmitting at irregular intervals may reduce the likelihood of two load control devices transmitting at the same time (which may cause a message collision), thereby reducing the risk that the message may be lost if another device is transmitting a second message at the same time. However, one will understand that the emergency mode message may alternatively be transmitted periodically, that is, at regular intervals.

As described, the system controller 140 may lose power when the utility power 102 undergoes a power outage. When the utility power turns back on, the system controller 140, the load control devices 122, 124, and the lighting loads 132, 134 may regain power. Upon regaining power, the system controller 140 may receive the emergency mode message from the control device 120, which may still be in emergency mode. In response to the system controller 140 receiving the emergency mode message, the system controller may transmit (i.e., broadcast) a command to the devices in the load control system 100 (e.g., the control device 120). The command may instruct the control devices that the load control system 100 is no longer in emergency mode. In response to the command transmitted by the system controller 140, the control device 120 may exit emergency mode. Upon exiting the emergency mode, the control device 120 may return to a last known state which may be recalled from the power failure memory. For example, the control device 120 may recall from memory the stored values of intensity and/or color temperature that were previously used to control the lighting load 130 before the emergency mode was enabled. Alternatively, the control device 120 may determine whether the area is occupied (i.e., based on receiving an occupancy command from one or more occupancy sensors 112). If the area is occupied, the control device 120 may turn on power to the load 130. If the area is not occupied, the control device 120 may turn off the lighting load 130.

Figure 2:
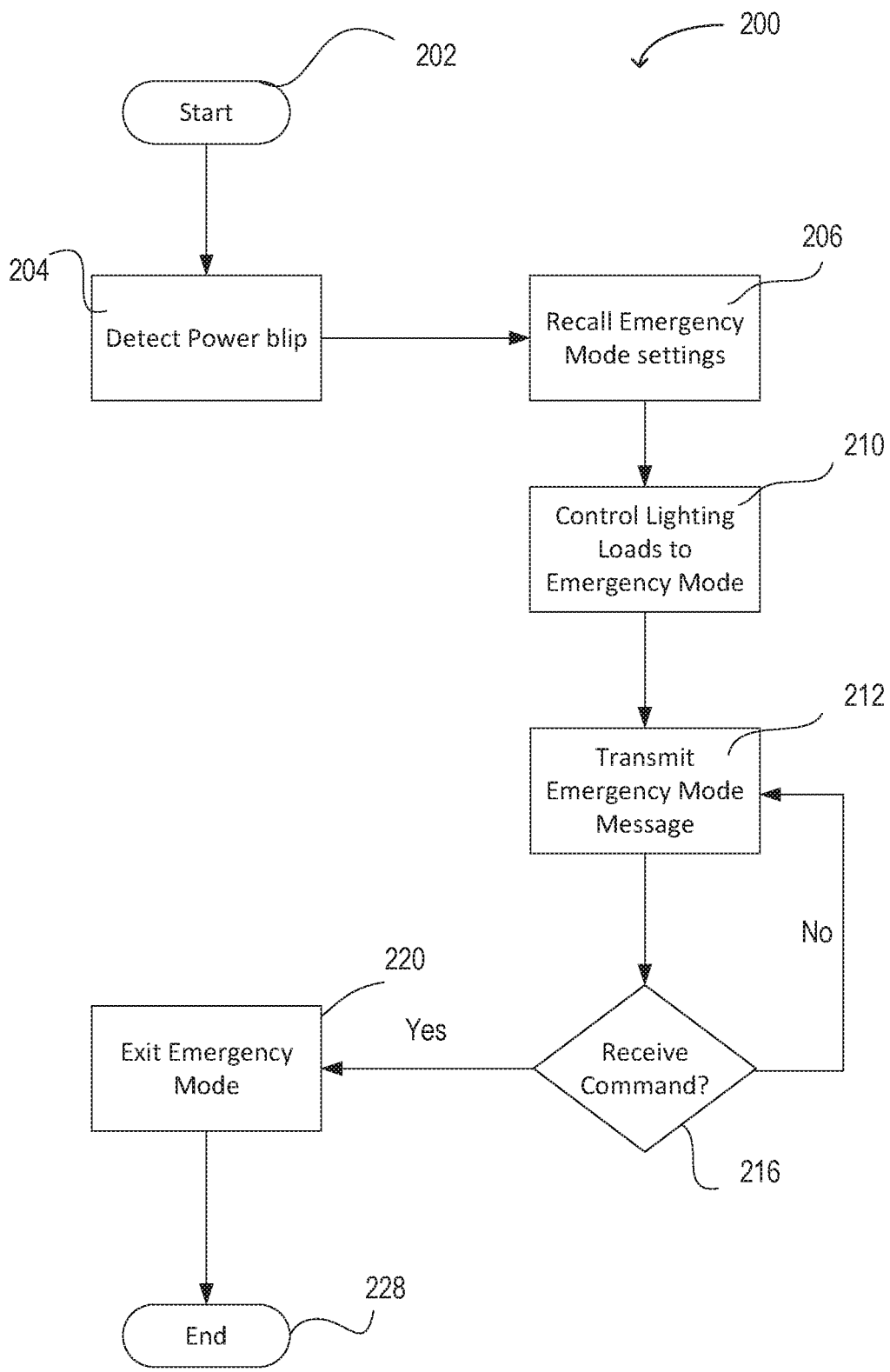
FIG. 2 is an example process which may be executed by a control device to enter and exit an emergency mode.

FIG. 2 is an example process 200 which may be executed by a control circuit of a control device which controls an emergency lighting load, such as control device 120 of FIG. 1. The process may start at 202. At 204, the control device may detect a power blip indicating that normal utility power may have been lost. For example, the power blip may indicate that utility power source 102 has lost power and that the transfer switch 110 has changed over to the emergency or backup power source 106 to power the control device 120. Or, the power blip may indicate that a momentary loss of utility power has occurred and been restored, for example, a short disruption of power.

In response to detecting the power blip, at step 206, the control device may enter the emergency mode by recalling emergency mode settings from memory. For example, an emergency mode setting may be a light intensity of 75%. At step 210, the control device may control the respective lighting loads according to the emergency mode settings (i.e., the control device may enter emergency mode). At step 212, the control device may transmit an emergency mode message indicating that the control device has entered emergency mode.

At step 216, the load control device may determine whether a command to exit emergency mode has been received. If the control device determines that a command to exit emergency mode has not been received, the control device may continue to periodically transmit the emergency mode message at step 212. If the control device has received a command to exit the emergency mode at step 216, the control device may then exit the emergency mode at step 220, thereby resetting the light level of the respective emergency lighting load to the last known state, i.e., based on recalling the light level (and/or color temperature) from power failure memory, as previously described. For example, if the emergency lighting load was in an off state when the power outage occurred, and the emergency lighting load was subsequently turned on in emergency mode, the control device may return the emergency lighting load to the off state when exiting the emergency mode. The process may end at step 228.

One will understand that resetting the lighting load to the last known state when exiting emergency mode may further be dependent upon an occupancy condition of the room. That is, the emergency load control device may set the intensity level and/or color temperature of the lighting load based on an occupancy state of the room in which the lighting load is installed. The emergency load control device may receive occupancy information from one or more occupancy sensors 112, and/or from one or more system controllers 140, to determine occupancy conditions.

For example, if the emergency lighting load 130 is installed in a room that was not occupied when the power outage occurred, but the room is occupied when power returns, the last known state during normal power of the emergency lighting load 130 may be an off state (because the room was not occupied when the normal power was last on). When power is lost, the emergency lighting control device 120 may turn on the emergency lighting load 130 due to the power outage. The room may become occupied before normal power is available. However, because the room is occupied when power returns, it may be desirable that the emergency lighting control device 120 maintain the emergency lighting load 130 in an on state, and not return to the last known state (i.e., the off state) when normal power resumes. For example, the emergency lighting control device 120 may be configured to receive occupancy commands from the occupancy sensor 112 and/or the system controller 140, and to store the occupancy commands in memory. Upon returning to normal power (e.g., the utility power source 102), the emergency lighting control device 120 may retrieve the occupancy command from memory and based on the last received occupancy command, the emergency lighting control device 120 may determine whether the room is currently occupied. Based on the determination, the emergency lighting control device 120 may adjust the light level of the lighting load 130. For example, if the emergency lighting control device 120 determines that the room is occupied, the emergency load control device 120 may maintain the load in an on state. However, if the emergency load control device 120 determines that the room is not occupied, the emergency load control device 120 may turn off the connected lighting load 130 when normal power is received. Alternatively, the emergency lighting control device 120 may receive occupancy commands during a power outage while the emergency lighting control device 120 is powered by a backup power source 106. For example, the occupancy sensor 112 may be battery-powered, and may not be dependent upon the utility power source. Or, the control device 120 may control the electrical load 130 based on message(s) received from the occupancy sensor 112 after power has been restored when the control device 120 exits the emergency mode.

The occupancy commands received by the emergency load control device 120 may be directly transmitted by one or more occupancy sensors 112. Alternatively, the system controller 140 may receive the occupancy command(s) from one or more occupancy sensors 112 and may transmit the occupancy command(s) to the respective emergency load control devices for that area in which the occupancy sensor(s) are located. Alternatively, the emergency load control device may have an integrated occupancy sensor. For example, the load control device 120 may have an occupancy sensor that is physically located on the fixture 130.

Figure 3:
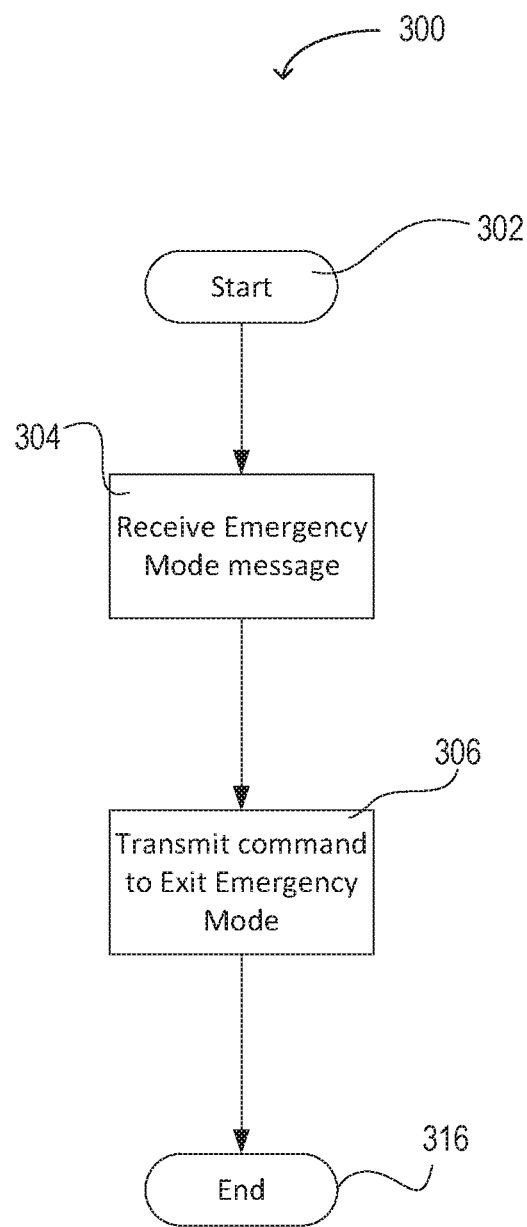
FIG. 3 is an example process which may be executed by a system controller, for example, to instruct one or more control devices to exit an emergency mode.

FIG. 3 is an example process 300 which may be executed by a control circuit of a system controller, such as the system controller 140, after power has been restored from a power outage. The process 300 may start at step 302. At step 304, the system controller may receive an emergency mode message. The emergency mode message may be from one or multiple emergency load control devices which may be operating in an emergency mode. Because the system controller is powered by utility power, the system controller may determine based on receiving the emergency mode message that power has been restored (i.e., the system controller can only receive the emergency mode message when utility power has been restored). At step 306, the system controller may transmit a command to exit emergency mode. The command may be transmitted wirelessly or via a wired connection to the one or multiple emergency load control devices. The process 300 may end at step 316.

A system may operate wherein the emergency mode devices enter and remain in an emergency mode until receiving a command to exit emergency mode, i.e., the emergency mode control devices do not transmit messages indicating that the control device is in emergency mode. However, different startup times between the system controller and other load control devices and/or control devices on separate circuits may lead to one or more control devices remaining in the emergency mode after power has been restored (i.e., instead of exiting the emergency mode and returning to normal operation). An advantage that the process 300 provides is that the process 300 detailed here may allow the control devices to exit the emergency mode when power is restored, which may apply not only for accidental power outages, but also for power outages due to routine maintenance. For example, if both the backup power and the utility power are temporarily turned off for electrical circuit maintenance, the emergency load control devices may startup in emergency mode when power is restored. Different load control devices (or load control devices on separate circuits) may take different amounts of time to startup and begin transmitting emergency mode messages. The advantage that the process 300 provides by allowing a command to exit emergency mode to be transmitted based on the system controller receiving an emergency mode message is that emergency load control devices with different startup times may not miss the command to exit emergency mode transmitted by the system controller.

Figure 4:
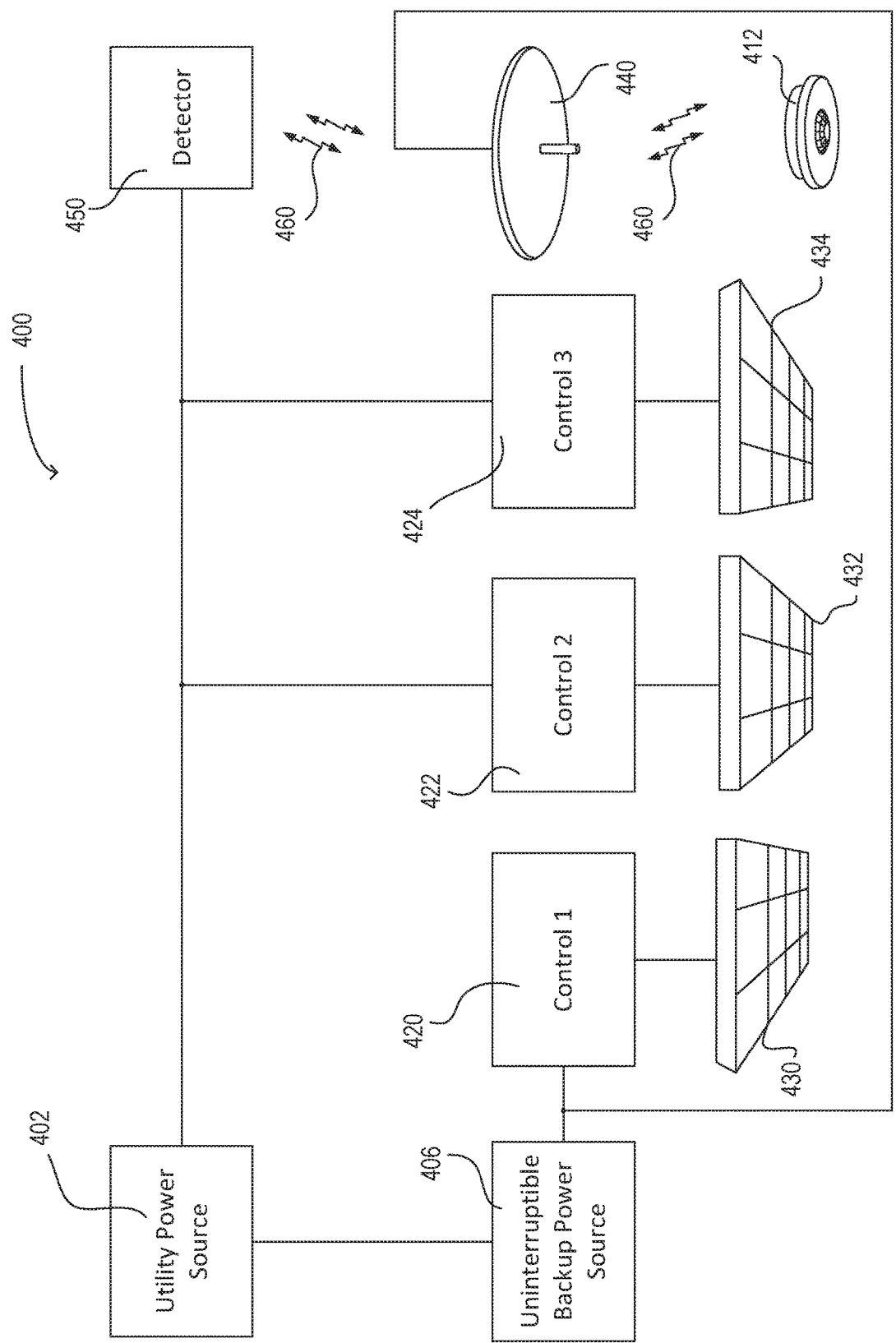
FIG. 4 is an example load control system according to a second example.

One disadvantage of the load control system 100 described in FIG. 1 is that the emergency load control devices may not be able to detect when to enter emergency mode if the emergency load control devices are powered by uninterruptible power supplies (i.e., if there is no power blip when power changes from the utility power to the backup power supply). FIG. 4 is an example load control system 400 that may be similar to the load control system 100 of FIG. 1. For example, the load control system 400 may have a utility power source 402 and a backup power source 406. The load control system may also include one or more occupancy sensor(s) 412. The control devices 422, 424 may be connected to utility power 402 and may control one or more connected lighting loads 432, 434. The load control system 400 may also include a system controller 440 and an emergency load control device 420 with a connected emergency lighting load 430. The emergency load control device 420 and the system controller 440 may be connected to, i.e., receive power from, the backup power source 406. The backup power source 406 may be an uninterruptible backup power source, for example, a battery backup power source.

The load control devices 420, 422, and 424 may receive power from the utility power source 402 during normal operation. For example, the load control devices 422, 424 may be directly powered by the utility power source. The emergency load control device 420 may be powered by the uninterruptible backup power source, which may also receive power from the utility power source 402. In the event of a power outage of the normal or primary utility power source 402, the uninterruptible backup power source 406 may changeover to provide power from the backup power source 406 (e.g., the battery backup).

In the configuration shown, the system controller 440 may also be connected to the uninterruptible backup power source 406. That is, the system controller 440 may remain powered in the event of a power outage of the utility power 402. Therefore, to detect a power outage, the load control system 400 may further include a detector 450. The detector 450 may receive power from the utility power 402 and may be configured to sense a loss in power of the utility power. For example, the detector 450 may sense that a power outage has occurred and the utility power 402 is no longer present. The detector 450 may transmit one or more messages to the system controller 440 based on detecting a power outage. The detector 450 may transmit messages via a wired or wireless connection. For example, the detector 450 may communicate via radio frequency (RF) signals 460 to the system controller 440. The detector 450 may communicate using any protocol, including, but not limited to: ZigBee, Bluetooth, Thread, or a proprietary protocol such as ClearConnect, etc. Alternatively or additionally, the detector 450 may communicate to the system controller 440 by changing a state of a relay or a contact closure output.

The system controller 440 may receive the message from the detector 450 indicating that a power outage has occurred. Upon receiving the message, the system controller may send a command to the load control devices of the system 400 to enter emergency mode. The devices of the system 400 which are still powered by the backup power source 406 (i.e., control device 420) may then set their respective loads to the emergency mode levels in response to receiving the emergency mode command.

One will understand that the power loss sense of the detector 450 may alternatively be added into the system controller 440. For example, the detector and/or the system controller comprising a detector may be powered via the utility power 402. The detector and/or system controller may contain a transient power supply (such as a capacitor), or a second power supply source, such as a battery, for example, which may allow the detector and/or the system controller to remain powered for at least a minimum amount of time required to send the emergency mode command to the emergency devices after a power outage has occurred.

The control device 420 may exit the emergency mode in any of several ways. According to a first example, similar to the example described with respect to FIG. 1, when the control device 420 is in the emergency mode, the control device 420 may transmit a message (i.e., repeatedly transmit a plurality of messages) indicating that the control device 420 is in the emergency mode. The detector 450 may transmit a message to the system controller 440 when power has been restored to the utility power source 402. The system controller may then transmit a message to the load control device 420 to exit the emergency mode in response to receiving the message from the detector that power is restored and receiving the message from the control device 420.

Alternatively, the control device 420 may not transmit the emergency mode message, but may rely on the detector to communicate with the system controller 440, with the system controller then instructing the control device 420 to enter and exit the emergency mode.

Figure 5:
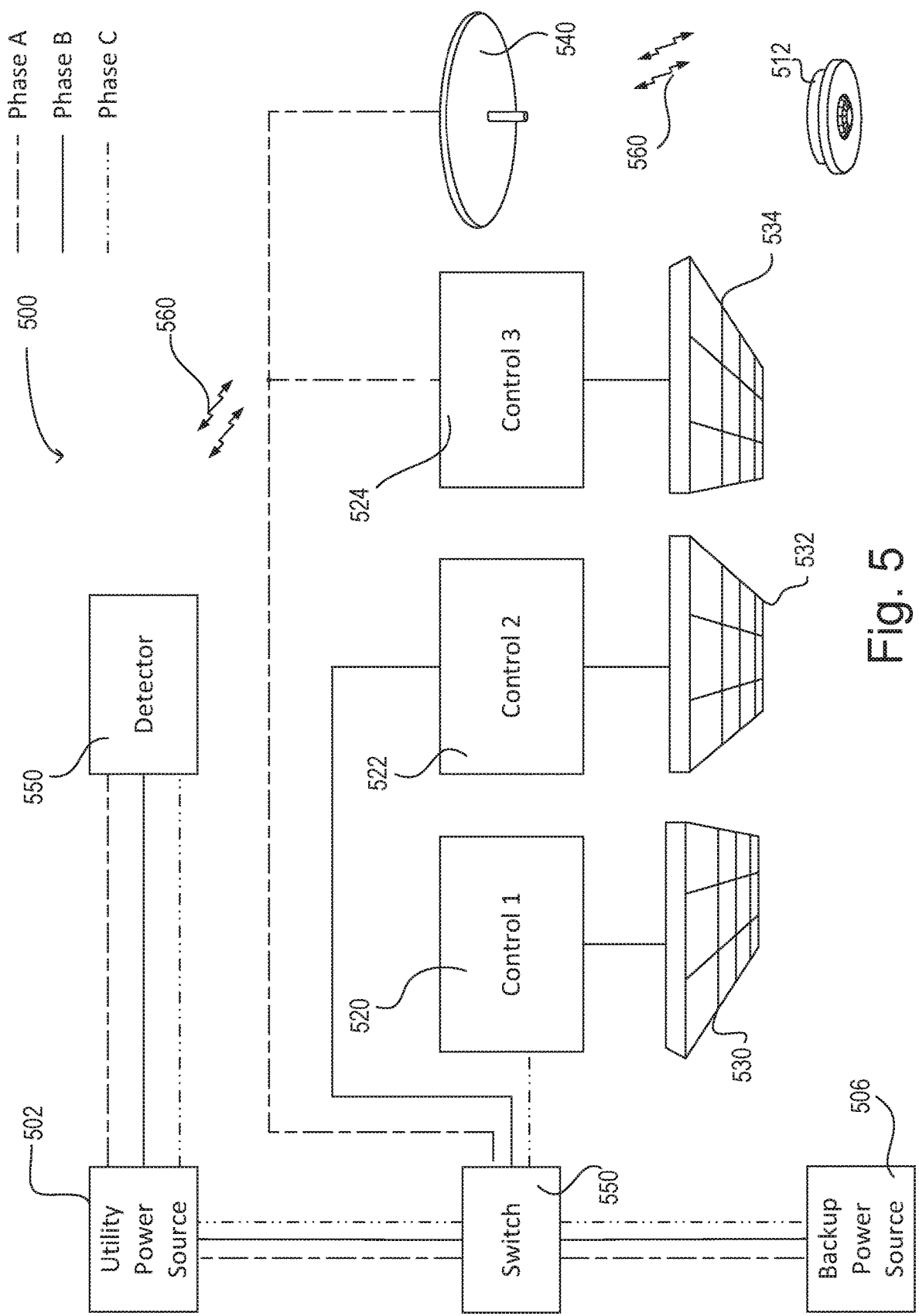
FIG. 5 is an example load control system according to a third example.

An additional variation of the load control system setup is shown in FIG. 5, which depicts a load control system 500 having multi-phase power. Similar to FIG. 4, the load control system 500 may have a utility power source 502 and a detector 550 for monitoring power loss of the utility power source 502. The detector 550 may wirelessly communicate with a system controller 540 via wireless signals 560, similar to that previously described for FIG. 4. (One will recognize wired communication variations may alternatively be implemented). Similar to FIG. 1, the load control system 500 may also contain a backup power source 506, and may further include a transfer switch 550 between the utility and emergency power supplies. For example, the transfer switch 550 may be an automatic transfer switch (ATS). Alternatively, and/or additionally, the backup power source 506 may include a battery backup, as described for FIG. 4. The load control system 500 may further contain one or more occupancy sensor(s) 512, similar to occupancy sensor 412 of FIG. 4.

In this example, the load control system 500 may have multi-phase power. For example, the load control system 500 may have three-phase power, as indicated by the solid and dashed lines showing phases A, B, and C. The devices of the load control system 500 may be wired to different phases of power. For example, although each load control device 520, 522, and 524 are wired to the transfer switch 550, each of the load control devices is shown as wired to a different phase of power. For example, control device 524 is wired to Phase A, control device 522 is wired to Phase B, and control device 520 is wired to Phase C. One will understand that groups of devices may be wired to different power phases, that is, additional devices may be wired to any of the respective power phases A, B, or C. For example, multiple load control devices may be wired to the same phase of power. The load control devices 520, 522, and 524 may control respective electrical loads, shown as lighting loads 530, 532, and 534.

Although the load control system 500 is shown as having a backup power source 506 with three phases of power, one will recognize that each power phase may be either a normal power supply with an emergency (i.e., backup) power supply, or, one or more power phases may only be powered by a normal power supply (i.e., utility power). In this example, the phases of power which are connected to the backup power supply 506 may be operable to enter an emergency mode. For example, if Phase B is only connected to the utility power 502, and not the backup power supply 506, the load control device 522 which is connected to Phase B may lose power during a power outage of the utility power 502 and may not enter emergency mode.

When a power outage occurs on one or more power phases A, B, and/or C, the transfer switch 550 may changeover power to the backup power source 506, similarly as has been described for the backup power source 106 of FIG. 1. For example, the transfer switch may be an automatic transfer switch (ATS). The changeover of power by the transfer switch 550 from the utility power source 502 to the backup power source 506 may create a momentary loss of power in one or more of the load control devices 520-524 (i.e., a power blip). The power blip may cause one or more of the load control devices 520-524 to experience a power on reset. In response to the power on reset, the load control device(s) may enter emergency mode. For example, phase C may experience a power outage. The load control device 520, which receives power from Phase C, as shown, may experience a power on reset as the transfer switch 550 changes over from the utility power source 502 to the backup power source 506. The load control device 520 may detect that a power blip has occurred (i.e., may detect a power on reset). In response to the power blip detection, the load control device 520 may enter emergency mode, and may set the lighting load 530 to an emergency mode level. The load control device 520 may transmit a message indicating that the load control device is in emergency mode.

The detector 550 may be configured to detect a power outage of any or all of the phases A, B, and C of the utility power 502. The detector 550 may transmit a message to the system controller when one or more phases of power has been lost (i.e., a power outage has occurred). For example, the detector 550 may trigger a contact closure output or change the state of a relay to alert the system controller 540 that a power outage has occurred.

Alternatively and/or additionally, the detector 550 may wirelessly transmit a message to the system controller 540 to indicate a power outage has occurred. The system controller 540 may receive the emergency mode message from the load control device 520. The system controller 540 may further receive a power outage message from the detector 550 indicating that power has been lost on one or more phases of the utility power source. After receiving the power outage message from the detector 550, the system controller may transmit a command to the devices of the load control system 500 (i.e., control devices 520, 522, and 524) to cause the load control devices to enter emergency mode. The load control devices 522 and 524 may enter emergency mode in response to receiving the command by the system controller 540. The control device 520 may also enter emergency mode in response to the command from the system controller 540, or the control device 520 may have previously entered the emergency mode based on detecting the power outage on Phase C, as previously described. When entering emergency mode, the load control devices 520, 522, and 524 may set their respective loads (e.g., lighting loads) 530, 532, 534, to their emergency mode levels.

When power is restored, the detector 550 may transmit a message to the system controller 540 that power has been restored. In response to the message that power has been restored, the system controller may transmit a command to one or more devices of the load control system 500 to instruct the devices to return to normal operation. For example, the load control device 520 may be in an emergency mode. In response to receiving a command to return to normal operation (i.e., exit emergency mode), the device may exit emergency mode and restore the connected lighting load 530 to a previous light intensity and/or color temperature, as previously described. In this example, the system controller may be connected to normal or emergency power. For example, if no backup power is connected to phase C, the system controller may be powered solely by the normal utility power. When the utility power experiences a power outage, the system controller may rely on a transient or secondary power supply to remain powered at least until sending out the command to the load control devices to enter emergency mode. For example, the system controller may be powered by a capacitor, solar cell, backup battery, etc.

Figure 6:
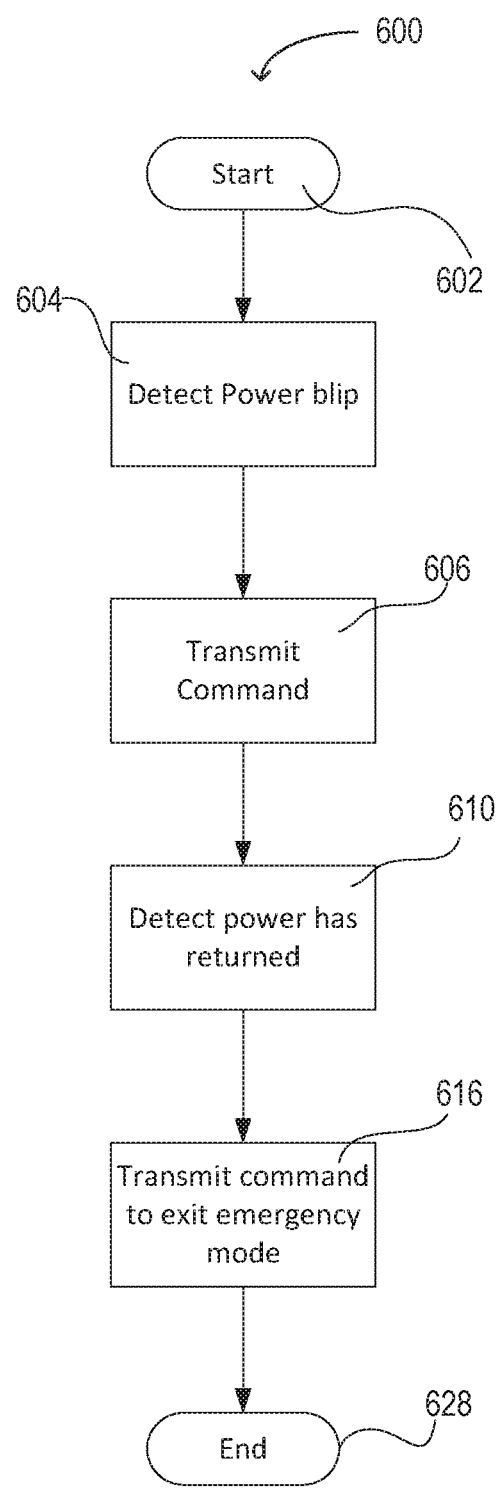
FIG. 6 is an example process which may be executed by a system controller during a power outage.

FIG. 6 is an example method 600 which may be executed by the system controller during a power outage, according to the system diagram of FIG. 5. The method may start at 602. At 604, the system controller may detect a temporary power outage (i.e., a power blip). In a first example, the system controller may be configured to detect the momentary loss of power as the system changes over from normal power to emergency power. In a second example, the system controller may only be connected to normal utility power and may detect a power outage as previously described. In a third example, the system controller may receive a communication from a detector, such as the detector 550, that a power blip or a power outage has occurred. The detector may be connected only to normal utility power, or the detector may be connected to normal/emergency power, as previously described. At step 606, the system controller may send a command to the devices of the load control system to go into emergency mode.

When normal power returns, the system controller may detect that power has returned at step 610. The system controller may detect the return of power in any of several ways. For example, the system controller may be attached to a phase of power that does not have a backup power, and the system controller may sense that power has been applied to the power terminals of the system controller. In another example, the detector may communicate to the system controller that power has been restored. The detector may be connected to one or several phases of power. For example, the detector may be connected to all three phases of power and may communicate to the system controller when any or all of the phases have experienced a power outage.

In response to detecting that power has returned, the system controller may transmit a command to exit emergency mode at step 616 to all devices to return the load control devices to normal operation. For example, the devices which were powered by the backup power source and operating in emergency mode may return to normal operation, as previously described. At 628, the method may end.

Figure 7:
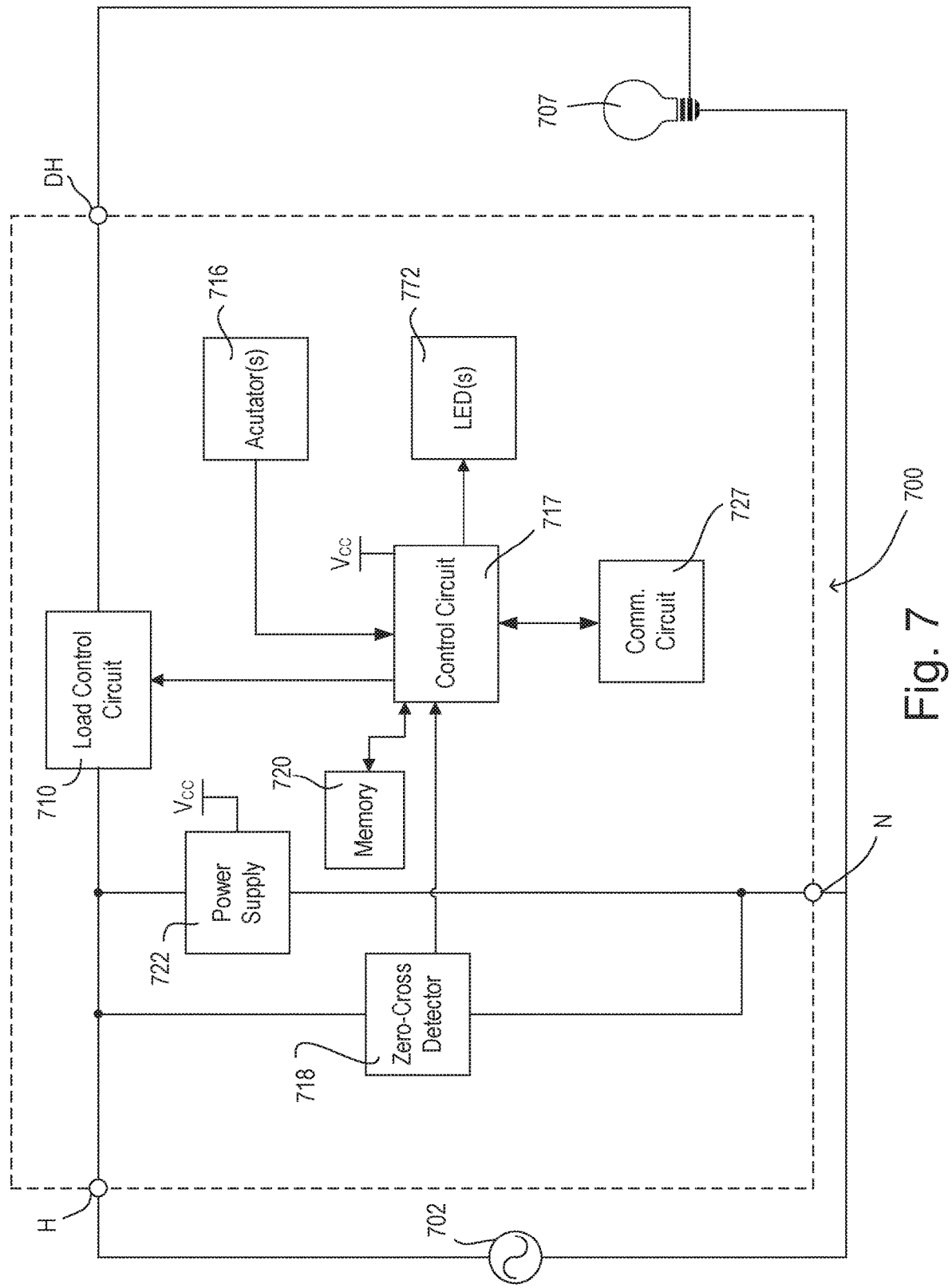
FIG. 7 is an example block diagram of a control device.

FIG. 7 is an example block diagram of a load control device 700, which may be responsive to entering an emergency mode, such as such as device 120 of FIG. 1, device 420 of FIG. 4, or any of devices 520, 522, and 524 of FIG. 5.

The control device 700 may be powered by a power source 702. The power source 702 may be any suitable alternating current (AC) or direct current (DC) power source. For example, the power source 702 may be an AC line voltage. Alternatively, the power source 702 may be a DC power source, such as a 12- or 48-volt supply provided by low voltage wires, Power over Ethernet (PoE), battery, solar cell, etc.

The control device 700 may have a hot terminal H for receiving power from an AC line voltage 702. The control device 700 may have a dimmed hot or switched hot terminal DH for providing power to a load 707. The load 707 may be a lighting load, such as an LED, a compact fluorescent lamp (CFL), incandescent lamp, halogen lamp, etc. For example, the lighting load may be any of load 130 of FIG. 1, 430 of FIG. 2, or 530, 532 or 534 of FIG. 5. The control device 700 may further have a neutral terminal N connected to a neutral connection of the power source 702.

The control device 700 may have a zero-cross detector 718 and a load control circuit 710. The zero-cross detector 718 and the load control circuit 710 may both be electrically connected to the hot terminal H and the control circuit 717. The zero-cross detector may monitor the line voltage from the hot terminal H to detect when the line voltage reaches a minimum. When the line voltage reaches a minimum, the zero-cross detector may provide a zero-cross timing signal to the control circuit 717. The control circuit may control the load control circuit 710 based on the zero-cross timing signal provided by the zero-cross detector 718. For example, the control circuit 717 may control the load control circuit 710 to provide a dimmed hot signal on terminal DH, where the dimmed hot signal may use phase angle dimming. The firing time of the load control circuit to provide the desired phase angle of the dimmed hot signal may be based on the zero-cross signal from the zero-cross detector 718. The load control circuit may be a controllably conductive device, such as a triac, silicon-controlled rectifier (SCR), field-effect transistor (FET), or the like.

The control device 700 may contain at least one power supply 722 which supplies a voltage $V_{CC}$ for powering the electronic circuitry of the control device. For example, the control device 700 may have a control circuit 717. The control circuit 717 may be powered by the voltage $V_{CC}$ provided by the power supply 722. The control circuit 717 may include one or more of a processor(s) (e.g., a microprocessor(s)), a microcontroller(s), a programmable logic device(s) (PLD), a field programmable gate array(s) (FPGA), an application specific integrated circuit(s) (ASIC), or any suitable controller or processing device or combination thereof.

The control device 700 may further include one or more actuators 716 for controlling the electrical load 707 and/or for programming or commissioning the load control device. For example, the actuator(s) 716 may be used to associate the control device 700 with one or more devices in the system during commissioning of the system. For example, a user may press the actuator(s) 716 to associate the control device 700 with a system controller, or with another control device, or sensor, etc. The actuator(s) 716 may be electrically connected to the control circuit 717. The actuators(s) 716 may include one or more actuators (on/off, dim, etc.). For example, the control circuit 717 may control the load control circuit 710 based on user input received from the user interface 716. For example, a user may actuate an on or off switch on the user interface 716 of the control device 700, and the control device 700 may control the load 707 on or off in response to receiving the user input at the user interface 716. Additionally, or alternatively, the user input may comprise dimming actuators for dimming the load 707 up and down.

The control device 700 may contain one or more light emitting diodes (LEDs) 772. LEDs 772 may be connected to the control circuit 717. The LEDs 772 may be used to communicate to a user by turning the LEDs on or off, and/or changing the color of the LEDs. For example, the LEDs 772 may change state when the control device 700 is in emergency mode. For example, the LEDs 772 may blink on and off repeatedly, or with a specific blink sequence, to indicate to a user that the control device 700 is in emergency mode. According to one example of a specific blink sequence, the LEDs 772 may turn on for a first period of 2000 milliseconds (ms), off for 200 ms, on for 200 ms, and off for 200 ms, after which the specific blink sequence may be repeated. Alternatively, the LEDs 772 may change color, for example, may turn from green to red, etc., to indicate to a user that the control device 700 is in emergency mode.

The control device 700 may contain one or more communication circuits 727 which are operably connected to the control circuit 717. The communication circuit 727 may be a wireless or a wired communication circuit and may receive wireless or wired signals from other devices in the load control system, such as the system controller. The signals received by the communication circuit 727 may contain load control commands. The control circuit may receive the signals from the communication circuit 727 and may control the load control circuit 710 based on the received signals. The communication circuit 727 may be a wireless communication circuit. The communication protocol may include one or more of the following: Wi-Fi, ZigBee, Bluetooth, Thread, or a proprietary protocol such as a ClearConnect, etc. Alternatively, the communication circuit 727 may be a wired communication circuit, for example, a USB-C, Ethernet or Cat5, Serial cable, or any other type of communication wiring. For example, the load control device 700 may communicate to the system controller via a wired protocol, such as a DALI or ECOSYSTEM communication protocol.

The control device 700 may have one or more memory modules ("memory") 720 (including volatile and/or non-volatile memory modules) that may be non-removable memory modules and/or removable memory modules. Memory 720 may be communicatively coupled to the control circuit 717. Non-removable memory 720 may include random-access memory (RAM), read-only memory (ROM), a hard disk, or any other type of non-removable memory storage. Removable memory 720 may include a subscriber identity module (SIM) card, a memory stick, a memory card, or any other type of removable memory. The memory 720 may have instructions, such as software based instructions, stored thereon that when executed by the control circuit 717 configure the control circuit to provide functionality as described herein.

Figure 8:
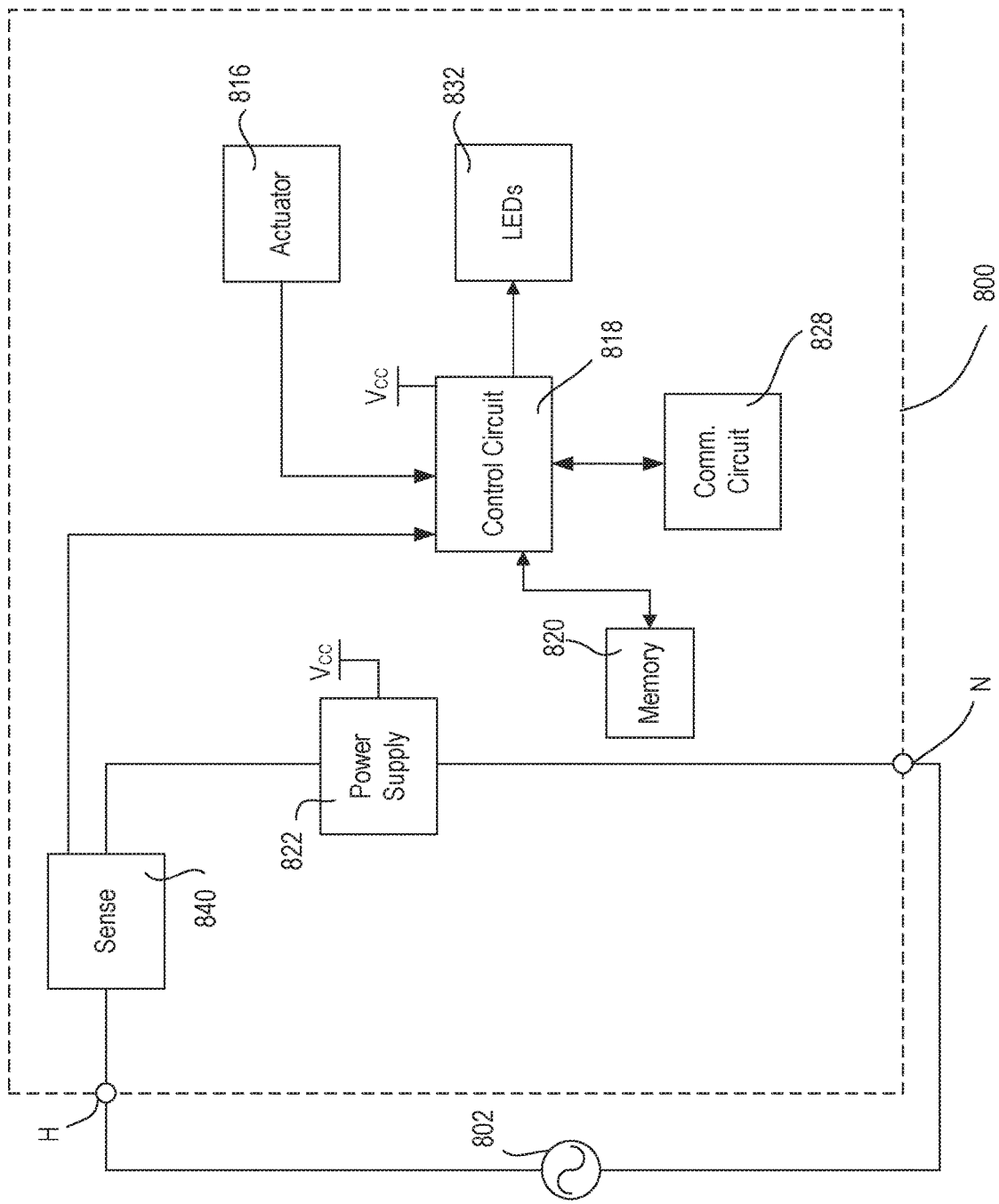
FIG. 8 is an example block diagram of a system controller.

FIG. 8 is an example block diagram of a system controller 800, such as such as system controller 140 of FIG. 1, system controller 440 of FIG. 4, or system controller 540 of FIG. 5. The system controller 800 may have a hot terminal H and a neutral terminal N for receiving power from an AC line voltage 802.

The system controller 800 may contain at least one power supply 822 which may supply a voltage $V_{CC}$ for powering the electronic circuitry of the system controller. The system controller 800 may have a control circuit 818. The control circuit may be powered by the voltage $V_{CC}$ provided by the power supply 822. The control circuit may include one or more of a processor(s) (e.g., a microprocessor(s)), a microcontroller(s), a programmable logic device(s) (PLD), a field programmable gate array(s) (FPGA), an application specific integrated circuit(s) (ASIC), or any suitable controller or processing device or combination thereof.

The system controller 800 may contain one or more communication circuits 828 which are operably connected to the control circuit 818. The communication circuit 828 may be a wireless or a wired communication circuit and may transmit wireless or wired signals to other devices in the load control system, such as load control devices. The signals transmitted by the communication circuit 828 may contain load control commands. The control circuit may also receive signals from a detector and may transmit messages, such as emergency mode messages, based on the received signals.

The communication circuit 828 may be a wireless communication circuit. The communication protocol may include one or more of the following: Wi-Fi, ZigBee, Bluetooth, Thread, or a proprietary protocol such as a ClearConnect, etc. Alternatively, the communication circuit 828 may be a wired communication circuit, for example, a USB-C, Ethernet or Cat5, Serial cable, or any other type of communication wiring. For example, the system controller 800 may communicate to one or more load control devices via a wired protocol, such as a DALI or ECOSYSTEM communication protocol.

The system controller 800 may have one or more memory modules ("memory") 820 (including volatile and/or non-volatile memory modules) that may be non-removable memory modules and/or removable memory modules. Memory 820 may be communicatively coupled to the control circuit 818. Non-removable memory 820 may include random-access memory (RAM), read-only memory (ROM), a hard disk, or any other type of non-removable memory storage. Removable memory 820 may include a subscriber identity module (SIM) card, a memory stick, a memory card, or any other type of removable memory.

The system controller 800 may also contain one or more LEDs 832. The LEDs may be used to communicate a system status to the user.

The system controller 800 may further include a sense circuit 840. The sense circuit may be operable to detect a power outage. For example, the sense circuit 840 may detect a momentary power loss or power blip as the input power 802 changes from a normal utility power source to a backup power source, such as a generator.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and non-transitory/tangible computer-readable storage media. Examples of non-transitory/tangible computer-readable storage media include, but are not limited to, a read only memory (ROM), a random-access memory (RAM), removable disks, and optical media such as CD-ROM disks, and digital versatile disks (DVDs).

What is claimed is:

1. A control device comprising:
a load control circuit for controlling power to one or more electrical loads;
a communication circuit;
a control circuit coupled to the communication circuit and the load control circuit; and
a memory coupled to the control circuit; and
wherein when power is applied to the control circuit, the control circuit is configured to:
recall an emergency mode control setting from memory;
control, via the load control circuit, the one or more electrical loads according to the emergency mode control setting; and
transmit, via the communication circuit, a message indicating the control device is in an emergency mode.

2. The control device of claim 1, wherein the electrical load is a lighting load.

3. The control device of claim 2, wherein the control device is configured to maintain the electrical loads according to the emergency mode control setting while the control device remains in the emergency mode.

4. The control device of claim 1, wherein the control device is configured to transmit the message a plurality of times while the control device is in emergency mode.

5. The control device of claim 4, wherein the control device is configured to transmit the message once per minute.

6. The control device of claim 1, wherein the control device is configured to exit emergency mode in response to receiving a message.

7. The control device of claim 6, wherein the control device is configured to exit the emergency mode in response to receiving the message from a system controller.

8. The control device of claim 7, wherein to exit the emergency mode, the control device is configured to recall a previous control setting from memory.

9. The control device of claim 2, wherein the emergency mode control setting comprises a preset intensity level.

10. The control device of claim 9, wherein the emergency mode control setting further comprises a preset color temperature.

11. A system comprising:
a load control device configured to operate in a normal mode and an emergency mode; and
a system controller, comprising:
a communication circuit; and
a control circuit operably connected to the communication circuit, the control circuit configured to:
receive, via the communication circuit, a message from the load control device, the message indicating the load control device is in emergency mode; and
transmit, via the communication circuit, a command to the load control device to exit emergency mode.

12. The system of claim 11, wherein the system controller is configured to receive power from an AC power source connected to an electrical utility; and
wherein the load control device is configured to receive power from the AC power source connected to the electrical utility during the normal mode, and further configured to receive power from a backup power source during the emergency mode.

13. The load control device of claim 12, wherein the load control device is configured to provide power to one or more lighting loads.

14. The load control device of claim 12, wherein during the emergency mode, the load control device is configured to repeatedly transmit the message to the system controller indicating the load control device is in emergency mode.

15. The load control device of claim 13, wherein during the emergency mode, the load control device is configured to recall an emergency mode setting from memory and control the one or more lighting loads according to the emergency mode control setting.

16. The load control device of claim 15, wherein the emergency mode control setting comprises at least one of a preset intensity and a preset color temperature.

* * * * *